(12) United States Patent
Koch, III (10) Patent No.: US 7,854,641 B2
(45) Date of Patent: Dec. 21, 2010

(54) HAND HELD REVERSIBLE AIR GAME CALLERS

(75) Inventor: Stanley G Koch, III, Gladwin, MI (US)

(73) Assignee: Greg Abbas, Beaverton, MI (US)

( * ) Notice: Subject to any disclaimer, the term of this patent is extended or adjusted under 35 U.S.C. 154(b) by 1265 days.

(21) Appl. No.: 11/429,499

(22) Filed: May 5, 2006

(65) Prior Publication Data
US 2006/0258257 A1 Nov. 16, 2006

Related U.S. Application Data

(63) Continuation-in-part of application No. 11/129,815, filed on May 13, 2005, now abandoned.

(51) Int. Cl.
A63H 33/40 (2006.01)
A63H 5/00 (2006.01)

(52) U.S. Cl. .................. 446/202; 446/208; 446/418

(58) Field of Classification Search ............ 446/202, 446/203, 205–208, 397, 418; 84/402, 403
See application file for complete search history.

(56) References Cited

U.S. PATENT DOCUMENTS

| | | | |
|---|---|---|---|
| 2,961,135 A | 11/1960 | Hughes | |
| 4,733,808 A | 3/1988 | Turner | |
| 4,888,903 A | 12/1989 | Knight | |
| 4,915,660 A | 4/1990 | Overholdt | |
| 5,035,390 A | 7/1991 | Sanders | |
| 5,111,981 A | 5/1992 | Allen | |
| 5,431,590 A | 7/1995 | Abbas | |
| 5,664,360 A | 9/1997 | Conway | |
| 5,820,000 A | 10/1998 | Timberlake | |
| 5,885,125 A | 3/1999 | Primos | |
| 5,988,469 A | 11/1999 | Musacchia | |
| 6,514,116 B2 | 2/2003 | Abbas | |
| 6,572,430 B1 * | 6/2003 | Primos | 446/207 |
| 6,878,867 B2 * | 4/2005 | Porath | 84/402 |
| 7,553,210 B1 * | 6/2009 | Keller et al. | 446/202 |

* cited by examiner

*Primary Examiner*—Kien T Nguyen
(74) *Attorney, Agent, or Firm*—Robert L. McKellar; McKellar IP Law, PLLC (57) ABSTRACT

Wild game calls comprising combinations of main housings, mouthpieces, lids, bellows, pitch adjusters, air chambers, adjustable seals, and air-activated sound-producing members, used for attracting wild game.

26 Claims, 6 Drawing Sheets

HAND HELD REVERSIBLE AIR GAME CALLERS

This application claims priority from U.S. Utility application Ser. No. 11/129,815 filed May 13, 2005.

BACKGROUND OF THE INVENTION

The present invention relates to wild game calls, and more particularly, to wild game calls for hunting and attracting wild game.

Many game calls have been designed and used by those trying to attract game for hobby and hunting purposes. Such calls are used to imitate the call or sounds of an animal or fowl so that the animal or fowl will come closer to the hunter to ensure that a proper shot is made so, or so that a better view can be had of the game. Such devices are typically used with shotguns, rifles, archery equipment, and the like.

Some calls are hand activated and some calls are activated by the hunter breathing into, or inhaling the breath, across a reed or some similar device, located in the device. Other calls are activated by foot mechanisms and some calls, such as turkey calls, are activated by the user having the call in the mouth and using puffs of breath across the call rather than blowing into a device.

Such calls can be, for example, found in U.S. Pat. No. 4,888,903, that issued on Dec. 26, 1989 to Knight, et al which is a reed type of game call that is operated by blowing and/or sucking on a single end of the call.

There is an animal call device that is disclosed in U.S. Pat. No. 4,915,660, that issued on Apr. 10, 1990 to Overholdt that is a restricted bore opening that is alleged to lower the tone of the device without having to cup hands around the discharge end of the device.

An atypical call is that disclosed in U.S. Pat. No. 5,885,125, that issued to Primos on Mar. 23, 1999, in which the device is a system of modules that can be interchanged to change the type of call that is required.

It is highly preferred by hunters to be able to activate such calls without obvious body movement, such as moving hands, arms, legs, and the like, and thus, devices that can be used in a hands-free, or leg and arm movement free, are highly desired.

It is also highly desirable to be able to activate such calls while holding a weapon in the ready position, that is, a drawn bow, or a rifle or shotgun mounted to the shoulder and thus, devices have been devised that allow for the hunter to mount the call on his or her person so that the hunter can have complete access and attention to the weapon.

Such a mounting device can be found, for example, in U.S. Pat. No. 2,961,135, that issued to Hughes, on Nov. 22, 1960 in which there is disclosed a duck call holder that has a holder attached to a wrist band and the call is attached to the holder.

A similar device can be found in U.S. Pat. No. 4,733,808, that issued on Mar. 29, 1988 to Turner in which there is a shown a flexible strap having attached thereto, a flexible encircling strap loop that will engage a duck call.

U.S. Pat. No. 5,035,390, that issued to Sanders on Jul. 30, 1991 deals with an adapter for attaching an animal call to a firearm.

There is disclosed in U.S. Pat. No. 5,988,469, that issued to Musacchia on Nov. 23, 1999, a holder for game calls and the like that is strapped to the limb of a hunter, for example, the thigh of the hunter, and in U.S. Pat. No. 5,431,590, that issued to Abbas on Jul. 11, 1995, there is disclosed a bow mounted game animal caller that allows the bowman to draw the bow without having to move the game caller.

U.S. Pat. No. 5,111,981 that issued on May 12, 1992 to Allen provides for a vest or shirt mounted game call holder.

U.S. Pat. No. 5,664,360, that issued to Conway on Sep. 9, 1997, deals with a holster that is mounted on the stock of a rifle or shotgun for holding game calls.

There is disclosed in U.S. Pat. No. 5,820,000, that issued on Oct. 13, 1998 to Timberlake, et al., yet another holder that is strapable to the wrist or arm of the user.

Finally, U.S. Pat. No. 6,514,116, that issued to Abbas on Feb. 4, 2003 deals with a hands-free, body-mounted game caller system that provides a flexible conduit to attach to the wild game call and the flexible conduit can be affixed to the upper portion of the user to allow the user to use the call without the use of any moving body parts.

THE INVENTION

In one embodiment, what is disclosed and claimed herein is a wild game call for use by hunters and others, comprising in combination a main housing having a top side, a bottom side, a near end, a distal end and a middle section. The main housing has an opening in the top side near the middle section and the opening has a back side and a front side, there being present at the backside, a hinge connection, and there being present a latch connection at the front side.

There is a mouthpiece slidably attachable to one end of the main housing, the mouthpiece having a hollow interior. The hollow interior has mounted therein a connecter for a flexible conduit.

The main housing has an air chamber mounted in essentially the middle section of the main housing. The air chamber has a near side, and a distal side, and a top opening, wherein the air chamber near side has an opening in it near the main housing bottom side to allow the passage of air into and out of the air chamber.

The air chamber has a vertical well located at the air chamber distal side and a threaded hole located in the bottom side of the main housing. The threaded hole opens into the air chamber.

There is a pitch adjuster threadedly insertable into the threaded hole, the pitch adjuster being comprised of a threaded staff mounted at the center of a knob wherein the threaded staff has a distal end, and the length of the pitch adjuster threaded staff is such that when fully turned into the threaded hole, the distal end of the staff will exceed the height of the air chamber.

Also included in the combination is an adjustable seal insertable in the vertical well at the air chamber, the adjustable seal comprised of a vertical wall with a bottom end, a top end, and a front surface, wherein the adjustable seal has a pull tab attached to the top end of the vertical wall. The adjustable seal is attached near the junction of the vertical wall and the pull tab and on the front surface of the vertical wall.

There is an adjustable tongue, the adjustable tongue being sized such that it will fit within the top opening in the air chamber.

In addition, there is a latchable, hinged lid that fits over the main housing top side opening, the lid having a back edge and a front edge, with the hinge located at the back edge and aligned with the hinge connection, and the latch located at the front edge and aligned with the latch connection.

In another embodiment, there is disclosed and claimed a wild game call as described just above, wherein the end opposite of the end with the mouthpiece has in addition, an adjustable bellows.

Still further, another embodiment is a wild game call as described just above wherein the connecter for a flexible conduit in the mouthpiece has a flexible conduit attached thereto, and the opposite end of the flexible conduit has an adapter that is slidably insertable into one end of the main housing.

A further embodiment of this invention is a wild game call as wherein there is a an air-actuated sound-producing member mounted on the top opening of the air chamber, and above the adjustable tongue to produce game calls.

A yet another embodiment is a wild game call wherein the component parts of the wild game call are manufactured from plastics.

In yet another embodiment, there is a wild game call, said wild game call comprising in combination a main housing having a top side, a bottom side, a near end, a distal end, and a middle section. The main housing has an opening in the top side near the middle section and the opening has a back side and a front side.

There is a mouthpiece slidably attached to one end of said main housing and, a call module insertable in the opening in the top side of the main housing, the call module comprising in combination a top plate, a back wall with a centered opening through it, a hollow reed holder having a distal end the distal end of the reed holder being insertable in the centered opening. There is a reed, the reed has a distal end, the reed being inserted at the distal end into the centered opening, beneath the hollow reed holder.

The main housing contains a partial vertical wall located near the back side of the opening in the main housing an there is a threaded hole located in the bottom side of the main housing. The threaded hole opens into the main housing beneath the call module.

There is a pitch adjuster threadedly insertable into the threaded hole, the pitch adjuster being comprised of a threaded staff mounted at the center of a knob, the threaded staff having a distal end, the length of the pitch adjuster threaded staff being such that when fully turned into the threaded hole, the distal end of the staff will touch the reed when the reed is fully compressed against the reed holder.

There is a flexible tab having a distal end, the flexible tab being located beneath the hollow reed holder and insertable by its distal end into the centered opening in the back wall.

In a final embodiment of this invention there is a predator call, the predator call comprising in combination a main housing that has an opening in the top side near the middle section and the opening has a back side and a front side.

There is a mouthpiece slidably attached to one end of said main housing and there is a call module insertable in the opening in the top side of the main housing. The call module comprises in combination, a top plate, a back wall with a back surface and a front surface, with a centered opening through it, the back wall also containing a second opening through it.

There is a freely rotatable knob located at the back surface of the back wall, said freely rotatable knob has a centered opening through it and a first set of three spaced-apart adjacent openings through it.

There is an elongated solid barrel located beneath the top plate and adjacent the back wall, the elongated solid barrel has a centered opening and a second set of three spaced-apart adjacent openings through it, said adjacent openings each having a different size from the other adjacent openings.

There is a shaft, the shaft is insertable in the centered opening of the elongated solid barrel and through the centered opening in the back wall and terminates in the centered opening of the freely rotatable knob such that the first set of three spaced-apart adjacent openings aligns with the second set of three spaced-apart adjacent openings and such that when the knob is rotated, the elongated solid barrel is also rotated.

There are indicator markings on the outside surface of the elongated solid barrel adjacent each of the different sized openings to indicate the opening size.

In another embodiment of this invention the invention comprises in combination, a retainer flap having a back edge, that is surmounted on a flexible diaphragm, said flexible diaphragm having an upper surface, a lower surface, and a back edge. There is also a tongue, a reed wedge, a flexible depressor molded into the lower surface of the flexible diaphragm, a flexible tongue, a reed surmounting the flexible tongue, a seal between the retainer flap and the flexible diaphragm, a back wall integrally attached to the back edge of the retainer, a flexible back support integrally attached to the back edge of the flexible diaphragm, a base having a centered threaded opening therethrough, said threaded opening containing therein a pitch adjuster threadedly insertable into the threaded hole. The pitch adjuster is comprised of a threaded staff mounted on the center of a knob, the threaded staff having a distal end. The length of the pitch adjuster threaded staff is such that when turned into the threaded hole, the distal end of the threaded staff can touch the tongue and has the capability of moving the tongue.

DETAILED DESCRIPTION OF THE INVENTION

Figure 1:
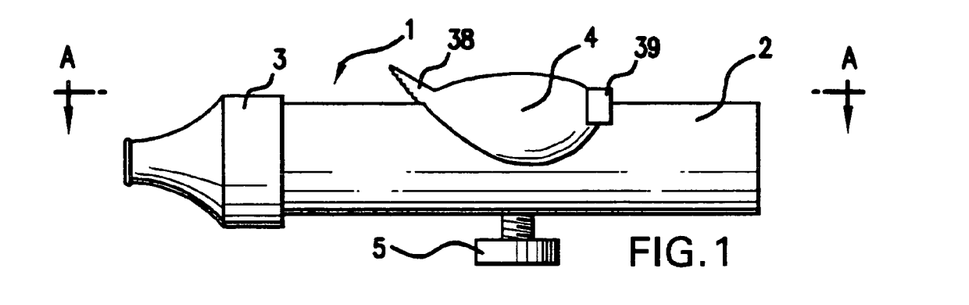
FIG. 1 is a full side view of a wild game call of this invention without the bellows.

Now turning to the Figures, and with regard to FIG. 1 there is shown a full side view of one embodiment of this invention, a wild game call 1, without the bellows.

Figure 2:
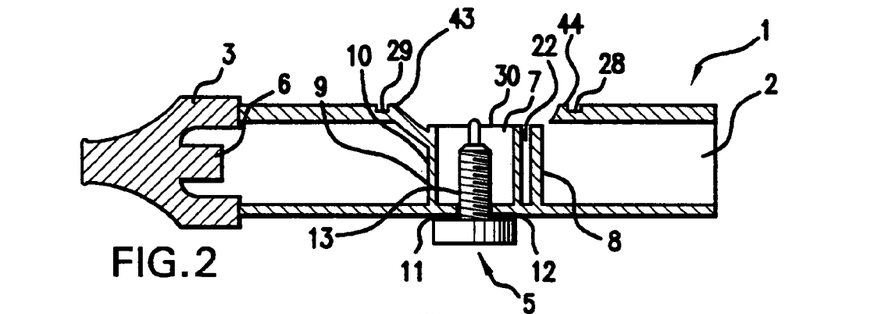
FIG. 2 is a full cross sectional side view of the device of FIG. 1 through line A-A.
Figure 4:
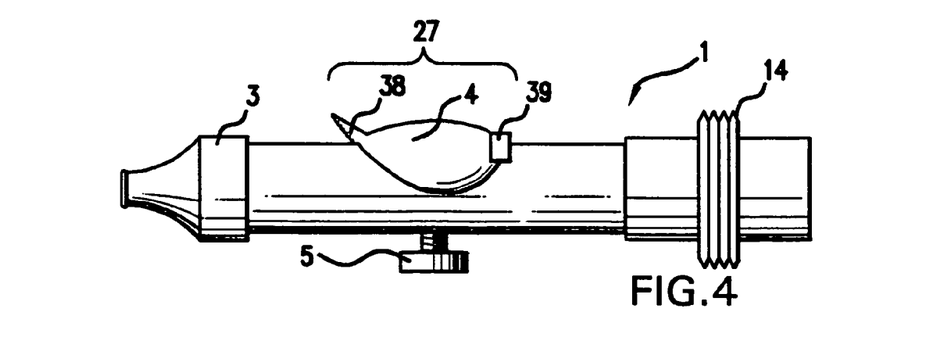
FIG. 4 is a full side view of the device of FIG. 1 with the bellows in place

The wild game call 1 is comprised of a combination of a main housing 2, having an opening 22 in the top side 23, and a middle section 27, a mouthpiece 3, a lid 4, a pitch adjuster 5, a hinge connection 28, and a latch connection 29. In addition, and with reference to FIG. 2, there is shown a cross sectional full side view of the wild game call of FIG. 1, showing a flexible conduit connector 6 in the interior of the mouthpiece 3, an air chamber 7 with a top opening 30, a vertical well 8 at the back 24 of the air chamber 7, and an air opening 9 in the front surface 10 of the air chamber 7. Also shown is a threaded hole 11, through which the pitch adjuster 5 is threaded by means of internal threads 12 in the threaded hole 11, and external threads 13 on the external surface of the pitch adjuster 5. FIG. 4 is a full side view of a wild game call of FIG. 1 that has a bellows 14 on one end.

The mouthpiece 3 is configured so that a person can mount the mouthpiece 3 in the mouth and hold it securely. The mouthpiece 3 is slidably mounted on one end of the main housing 2. The wild game calls 1 of this invention are configured such that the main housing 2 is reversible, in that the bellows 14 and the mouthpiece 3 are interchangeable. In this manner, the wild game call 1 is not subjected to freeze up, as when the weather is very cold, the user does not have to exhale in to operate the device, the operator can inhale and get the same sounds as exhaling and in this manner, the device does not freeze up. Since the bellows 14 and the mouthpiece 3 are both frictionally, slidably mounted on the main housing 2, this reversing is very simple.

It should be noted that the bellows 14 is not required for all types of game calls, and the wild game call 1 can either be equipped with the bellows 14, or it does not need to be equipped with the bellows 14. The bellows 14 operates just as does conventional bellows used in game calls, in that, when the bellows 14 is in the compressed state, the tone of the sound is high and when the bellows 14 is extended by means of the accordion middle section 15, the tone is lower and guttural.

Figure 3:
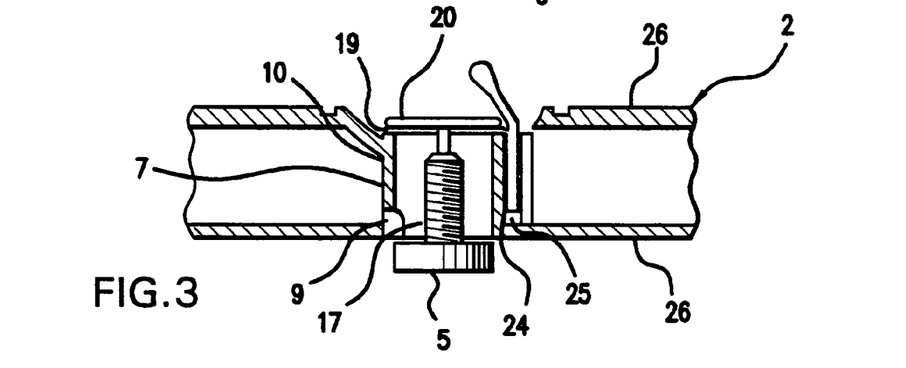
FIG. 3 is an enlarged view of the middle section of FIG. 2, showing the adjustable seal and air-activated sound member in detail.
Figure 6:
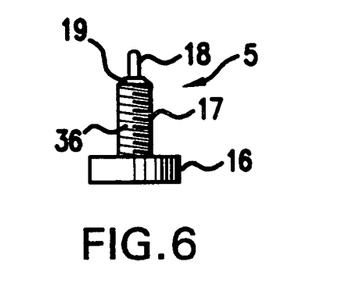
FIG. 6 is a full front view of the pitch adjuster of this invention.

The pitch adjuster 5 (see FIG. 6) is comprised of a knob 16, a centered staff 17 and a small nipple 18 on the top 19 of the staff 17. The staff 17 is threaded 36 on the outside in order to enable one to turn the pitch adjuster 5 in and out of the threaded opening 11 located in the bottom side 21 of the main housing 2. As the pitch adjuster 5 is moved into the air chamber 7, it eventually contacts the adjustable tongue 19, shown in FIG. 3 (partially in phantom), and by contacting and moving the adjustable tongue 19 upwards, the pitch of the sound is increased, owing to the fact that by moving the adjustable tongue 19 upwards, the air-actuated sound-producing member 20 (shown as a turkey call in FIG. 3) is distended causing a smaller amount of air to pass over and around the air-actuated sound-producing member 20.

Figure 5:
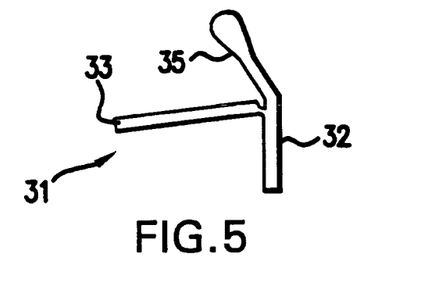
FIG. 5 is a full side view of the adjustable seal of this invention.

Turning now to FIG. 5, there is shown an adjustable seal 31 comprised of a seal member 32, a tab 35 for adjusting the adjustable seal 31 in the vertical well 25. The adjustable seal 31 also has an adjustable tongue 33, which is sized to fit into the top opening 30 of air chamber 7 and moves freely up and down in the air chamber 7, with it being understood, that the adjustable tongue 33, when contacted by the distal end 34 of the threaded staff 17 is adjustable within and without the top opening 30 of the air chamber 7 and this is what adjusts the pitch of the air-activated sound-producing member 20.

Figure 7:
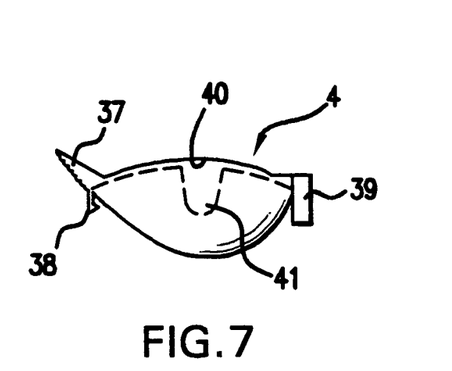
FIG. 7 is a full side view of the lid of this invention.

FIG. 7 illustrates the lid 4 of the instant invention and there is shown the lid 4, a pull tab 37, a latch 38, a hinge 39 and shown in phantom is a flexible tab 41 that is located on the interior surface 40 of the lid 4. The flexible tab 41 compresses the air-activated sound-producing member enough to keep the air-activated sound-producing member in alignment with the top edge of the air chamber 7 when the lid 4 is closed.

The hinge 39 is operable by inserting the hinge 39 in the hinge connection 28 and the back edge 44 of opening 22 of the main housing 2. The latch 38 is located on the front edge 43 of the lid 4, and when the lid 4 is closed, the latch 38 engages the latch connection 29 and holds the lid 4 against the outside surface of the main housing 2. It is not necessary for the lid 4 to compress and tightly air seal the opening 22.

Figure 8:
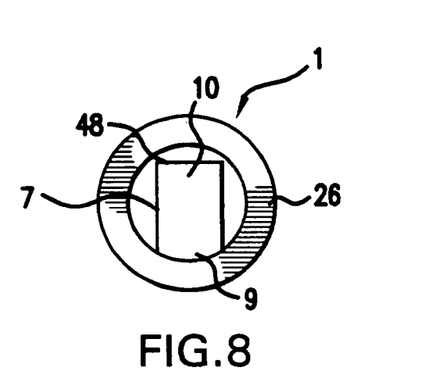
FIG. 8 is a full end view of the main housing of the device of this invention showing the air chamber and the opening therein.

FIG. 8 shows the front end of the wild game call 1 from FIG. 1, without a mouthpiece 3. The Figure shows the air chamber 7 looking at the front surface 10 thereof, the main housing wall 26, and the air opening 9. It should be noted that when the adjustable tongue 33 is in place, one cannot view the opening 48 as it is blocked by the adjustable tongue 33 while the lid 4 is closed and the device is in operation.

Figure 9:
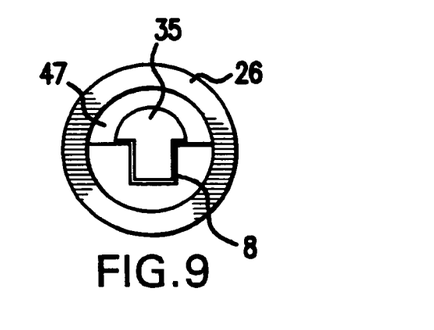
FIG. 9 is a full opposite end view of the main housing of this invention showing the adjustable seal in place in the housing.

Turning now to FIG. 9, there is shown a full end view of the device of FIG. 1 and there is shown the main housing wall 26, a small portion of the vertical well 8, the back wall 46 of the vertical well 8, the pull tab 35, and an air passage 47. It should be noted, that the back wall 46 need not be a full wall, it can be slots as long as the seal member 32 is held in place. It is not necessary for the wall to be a complete wall to control air, as no air moves through this portion of the wild game call 1.

Figure 10:
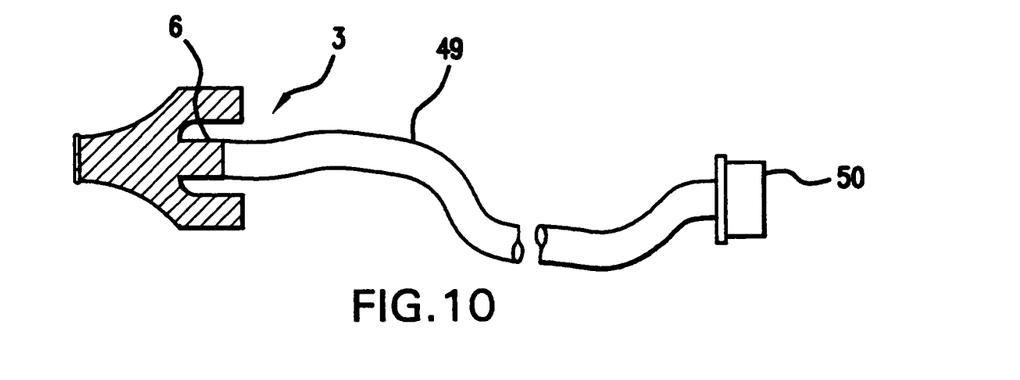
FIG. 10 is a view of the flexible conduit of the inventive device showing the end connector and the mouthpiece.

FIG. 10 shows an embodiment of the invention in which the mouthpiece 3 is modified with a connector 6 for a flexible conduit 49 mounted on the interior of the mouthpiece 3 that can be removed and attached to a flexible conduit 49 using the flexible conduit connector 6. On the opposite end of the flexible conduit 49, there is attached a connector 50, that is adaptable to one end of the main housing 2, by inserting the connector 50 into the interior of the main housing 2. By this means, the flexible conduit 49 can be as long as is needed to bring the mouthpiece 3 up to the mouth of a person using the wild game call 1, and thereupon, cause a hands-free use of the device. This embodiment of the invention is useable with all of the wild game calls and predator calls set forth in this invention.

Figure 11:
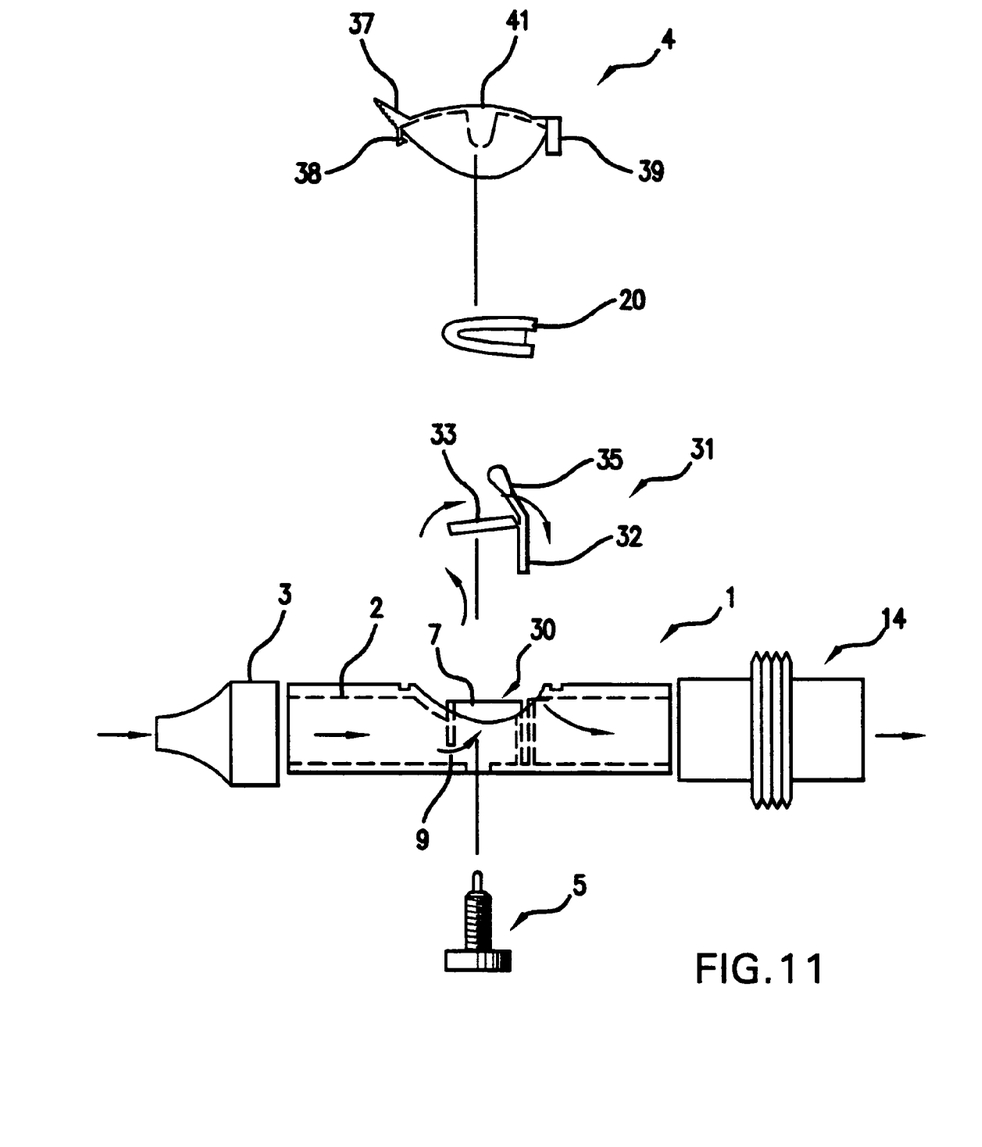
FIG. 11 is a schematic, exploded full view of a device of this invention showing the intended movement of air through the device.

Turning to FIG. 11, which is a schematic exploded full side view of the wild game call 1 as shown in FIG. 4, there is shown the general air flow through the device, assuming that the user is blowing into the mouthpiece 3 end of the device.

It should be noted that the air moves into the main housing 2, and through the front surface opening 9 of the air chamber 7, and then through the air chamber 7 through the top opening 30 of the air chamber 7, around the adjustable tongue 33, past the air-activated sound member 20 to product the desired sound, over and around the tab 35, through air passage 47, through the bellows 14, and out of the device.

It will be recalled that the bellows 14 and the mouthpiece 3 can be interchanged and the device operated by inhaling, without changing any of the other components.

It will be further recalled, that the adjustable seal 31 can be moved up and down in the vertical well 8 to open and partially close the air passage 47. By narrowing the air passage 47, the air-activated sound member 20 will have a higher pitch and by opening the air passage 47, the air-activated sound member 20 will have a lower pitch.

Figure 18:
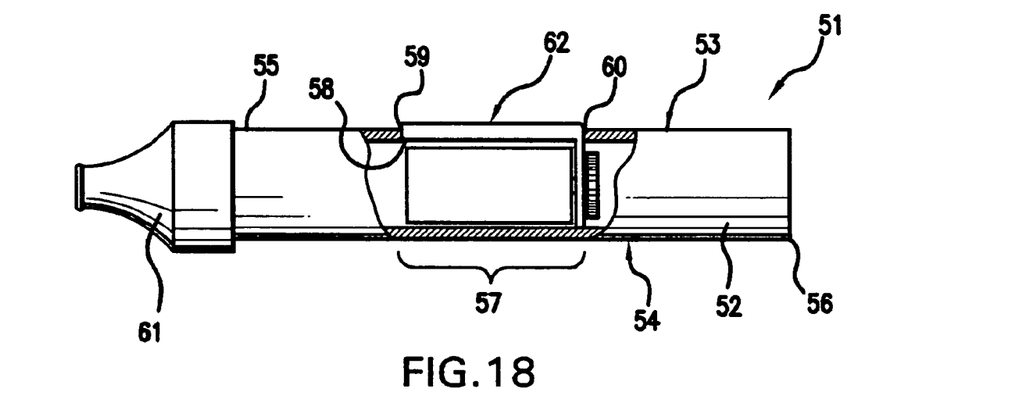
FIG. 18 is a full side view of the predator game call of FIG. 18, having a partial break away to show the call module of FIG. 12 in the call.

In another embodiment and with reference to FIG. 18, there is shown another wild game call 51 of this invention which contemplates the use of a call module 62.

There is shown in FIG. 18, a a predator call 51 having a main housing 52, that has a tope side 53, a bottom side 54, a near end 55, a distal end 56, and a generally middle section 57.

The main housing 52 has an opening 58 in the top side 53, near the middle section 57 and the opening 58 has a front edge 59 and a back edge 60. There is a mouthpiece 61 that is slidably attached to one end, in this case, the near end 55 of the main housing 52.

With reference to FIGS. 12 to 17, there is located in the opening 58 of the main housing 52, a call module 62. The call module 62 is slidably insertable through the opening 58 and rests on the bottom of the main housing 52. The call module 62 is comprised of a top plate 63, a back wall 64, with a centered opening 65 therethrough, wherein the back wall 64 has a back surface 66 and a front surface 67. The back wall 64 also has a second opening 68 therethrough.

There is a freely rotatable knob 70 located at the back surface 66 of the back wall 64, the freely rotatable knob 70 having a centered opening 69 therethrough. The freely rotatable knob 70 has at least two openings adjacent the centered opening 69, and each of these holes, shown in FIG. 16 as four holes 81, 82, 83, and 84, are sized equivalently to the openings 72 to 75 of the elongated solid barrel 80.

Figure 12:
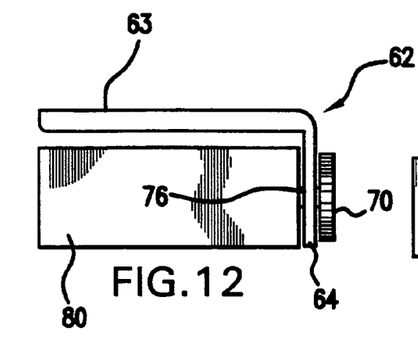
FIG. 12 is a full side view of a call module of this invention, utilizing an elongated solid barrel.
Figure 13:
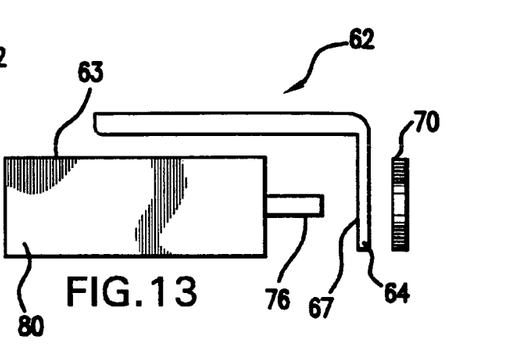
FIG. 13 is an exploded view of FIG. 12.
Figure 14:
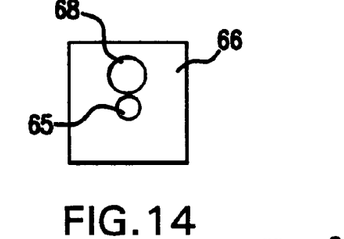
FIG. 14 is a full view of the back wall of the call module of FIG. 12.
Figure 15:
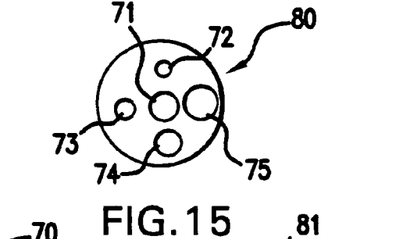
FIG. 15 is a full end view of the elongated solid barrel of the call module of FIG. 12.
Figure 16:
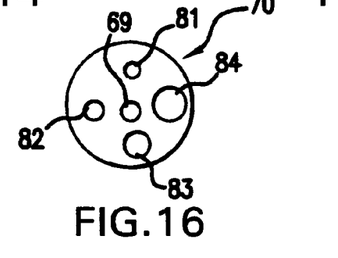
FIG. 16 is a full end view of the knob of the call module of FIG. 12.
Figure 17:
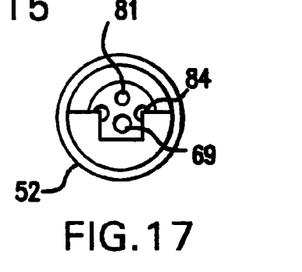
FIG. 17 is a full end view of the distal end of the predator game call of FIG. 18.

In addition, there is an elongated solid barrel 80 located beneath the top plate 63 and adjacent the front surface 67 of the back wall 64. The elongated solid barrel 80 has a centered opening 71 and at least two spaced-apart adjacent openings, and in the Figure, four such openings 72, 73, 74, and 75 are shown. Each of the openings 72-75 have a size different than any of the other openings 72 to 75, the reason for being set forth infra.

There is a common shaft 76, and the shaft 76 is insertable in the centered opening 71 of elongated solid barrel 80. The shaft 76 extends through the centered opening 65 of the centered opening 64 and terminated in the centered opening 69 of the freely rotatable knob 70 such that as the knob 70 is rotated, the elongated solid barrel 80 is simultaneously rotated. It should be noted that when the knob 70 is attached to the shaft 76, the same sized holes of the knob 70 are aligned with the same sized holes of the elongated solid barrel 80.

Finally, there are indicator markings on the outside surface 85 of the elongated solid barrel 80 to indicate the size of the openings 72 to 75. The smaller the openings, the higher the pitch of the call when air is blown through the call, and the larger the openings, the lower the pitch of the call. In this manner, the operator can select the call that is required for the game that is being pursued.

In use, the call module 62 is inserted into the top opening 58 by inserting the knob end first, and then seating the call module down into main housing. The top plate 63 fits sufficiently into the top opening 58 that a gasket is not required, and thus, the top plate 63 is fitted to the top opening 58 so as to stop any air that could normally escape from a loose fitting top plate 63. This directs any air blown into the call through one of the openings 72 to 75 of the elongated solid barrel 80, depending on which opening 72 to 75 is aligned with the second opening 68 through the back wall 64. The air moves through the second opening 68 of the back wall 64 and on through the equivalent opening 81 to 84 in the knob 70, to create the sound of a predator call. It will be noted from FIG. 17, that there is a back wall 85 affixed to the interior of the main housing 52 to support and hold the call module 62, and that this back wall 85 is only a partial wall and thus allows the passage of air through the call.

Figure 21:
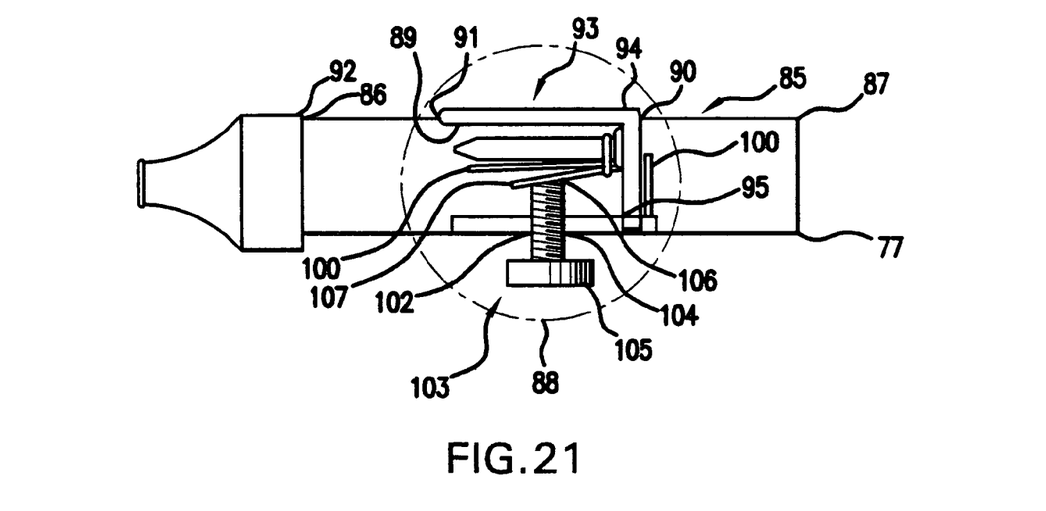
FIG. 21 is a full side view of the wild game call using a reed, having a partial break away to show the call module of FIG. 19 in the call.

Turning now to FIG. 21, there is shown yet another embodiment of this invention, which is a wild game call 85, which is reed operated.

There is shown a main housing 77, having a top side 78, a bottom side 79, a near end 86, a distal end 87, and a general middle section 88. The main housing 77 has a top opening 89 near the middle section 88 and the top opening 89 has a back edge 90 and a front edge 91. There is a mouthpiece 92, that is slidably attached to one end of the main housing 77.

Figures 19, 20:
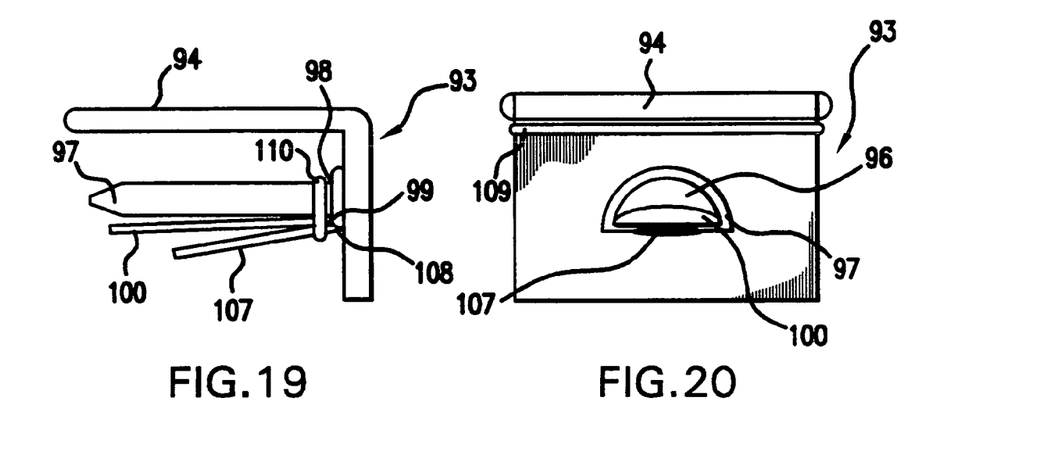
FIG. 19 is a full side view of the call module of the wild game call of FIG. 21.
FIG. 20 is a full back view of the call module of the wild game call of FIG. 21.

There is a call module 93 that is insertable in the top opening 89 of the main housing 77. The call module 93 is comprised of a top plate 94, a back wall 95, with a centered opening 96 therethrough, a hollow reed holder 97, having a distal end 98, wherein the distal end 98 of the hollow reed holder 97 is inserted in the centered opening 96. There is a reed 100, the reed 100 having a distal end 99, said reed 100 being inserted at its distal end 99 into the centered opening 96, beneath the hollow reed holder 97.

The main housing 77 contains a partial vertical wall 101, that is located near the back edge 90 of the top opening 89. This partial vertical wall 101 provides support for the call module 93 while contained in the main housing 77.

There is a threaded hole 102 located in the bottom side 79 of the main housing 77. The threaded hole 102 opens into the main housing 77, beneath the call module 93. There is a pitch adjuster 103 threadedly insertable into the threaded hole 102, the pitch adjuster 103 being comprised of a threaded staff 104 mounted at the center of a knob 105, the threaded staff 104 having a distal end 106. The length of the pitch adjuster threaded staff 104 being such that when fully turned into the threaded hole 102, the distal end 106 of the threaded staff 104 will touch the reed 100 when the reed 100 is fully compress against the reed holder 97, it be recognized that the flexible tab 107 will be between the reed 100 and the distal end 106 of the threaded staff 104.

There is a flexible tab 107 that has a distal end 108, the flexible tab 107 being located beneath the hollow reed holder 97 and insertable by the distal end 108 into the centered opening 96 in the back wall 95. There is an O-ring 110 situated around the combination of reed holder 97, reed 100, and flexible tab 107, at the distal end 99 of the reed 100 that serves to bring the distal end 99 of the reed 100, the flexible tab 107 and the reed holder 97 together such that when the threaded staff 104 has lost contact with the flexible tab 107, the ends of the combination stay together.

The pitch adjuster 103 allows for the reed 100 to be compressed against the reed holder 97 such that when the reed 100 is compressed, the call sound will be higher, and when the pitch adjuster 103 is moved away from the reed holder 97, the call sound will be lower.

It should be noted that the use of a gasket 109 to seat the call module 93 into the top opening 89 is optional.

Figure 22:
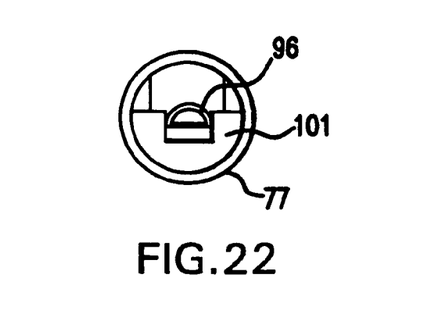
FIG. 22 is a cross sectional full side view of a wild game call module.

FIG. 22 is a cross sectional full side view of another module 110 of this invention which can be substituted for the module 62 in FIG. 18. This module 110 enables one to adjust the pitch of the call to accommodate females and calves.

Figure 23:
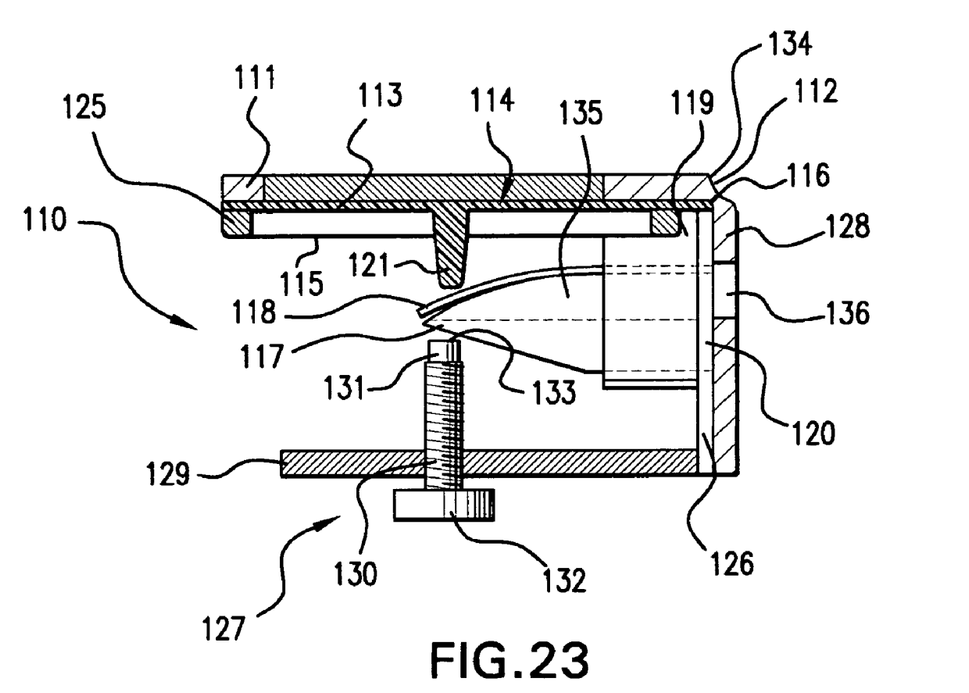
FIG. 23 is a cross section view of a portion of another embodiment of a wild game call.

With regard to FIG. 23 there is shown in combination a retainer flap 111 having a back edge 112, that is surmounted on a flexible diaphragm 113, said flexible diaphragm 113 having an upper surface 114, a lower surface 115, and a back edge 116.

The retainer flap 111 has a hinge 134 at the back edge 115 that allows for the opening of the retainer flap 110 to get at the flexible diaphragm 113. The flexible diaphragm 113 is then removable from the module 110. There is also a tongue 117 that supports the reed 118 and a reed wedge 119 that fixes the reed into the opening 120 in the flexible back support 126. There is a flexible riser 121 molded into the lower surface 122 of the flexible diaphragm 113, the flexible riser 121 having the capability of raising the flexible diaphragm 113 when the pitch adjuster 127 is twisted inwardly to move the tongue 117 that moves the reed 124 that adjusts the pitch of the call. The reed 124 surmounts the flexible tongue 117 and there is a seal 125 between the retainer flap 111 and the flexible diaphragm 113. There is a back wall 128 integrally attached to the back edge 112 of the retainer flap 111 and a flexible back support 126 integrally attached to the back edge 116 of the flexible diaphragm 113. The base 129 has a centered threaded opening 130 therethrough and the threaded opening 130 contains therein a pitch adjuster 127 threadedly insertable into the threaded opening 130. The pitch adjuster 127 is comprised of a threaded staff 131 mounted on the center of a knob 132, the threaded staff 131 having a distal end 133. The length of the pitch adjuster threaded staff 131 is such that when turned into the threaded opening 130, the distal end 133 of the threaded staff 131 can touch the tongue 117 and has the capability of moving the tongue 117. By this means, the pitch of the call can be adjusted in that the higher the flexible diaphragm 113 is moved, the higher the pitch of the call. There is an air channel 135 in the tongue 117 that extends all the way through the tongue 117 and has an exit port 136 at the back of the module 110.

What is claimed is:

1. A wild game call, said wild game call comprising in combination:
   a main housing having a top side, a bottom side, a near end, a distal end and a middle section; said main housing having an opening in the top side near the middle section and said opening having a back side and a front side, there being present at the backside, a hinge connection, and there being present a latch connection at the front side;
   a mouthpiece slidably attachable to one end of said main;
   said main housing having an air chamber mounted in essentially the middle section thereof;
   said air chamber having a near side, and a distal side, and a top opening;
   said air chamber near side having an opening therein near the main housing bottom side to allow the passage of air into and out of the air chamber;
   said air chamber having a vertical well located at the air chamber distal side thereof;
   a threaded hole located in the bottom side of the main housing, said threaded hole opening into the air chamber;
   a pitch adjuster threadedly insertable into the threaded hole, said pitch adjuster being comprised of a threaded staff mounted at the center of a knob, said threaded staff having a distal end, the length of the pitch adjuster threaded staff being such that when fully turned into the threaded hole, the distal end of the staff will exceed the height of the air chamber;
   an adjustable seal insertable in the vertical well at the air chamber, said adjustable seal comprised of a vertical wall with a bottom end, a top end, and a front surface, said adjustable seal having a pull tab attached to the top end of the vertical wall, the adjustable seal having attached near the junction of the vertical wall and the pull tab and on the front surface of the vertical wall, an adjustable tongue, said adjustable tongue being sized such that it will fit within the top opening in the air chamber;
   a latchable, hinged lid that fits over the main housing top side opening, said lid having a back edge and a front edge, with the hinge located at the back edge and aligned with the hinge connection, and the latch located at the front edge and aligned with the latch connection.

2. A wild game call as claimed in claim 1 wherein the mouthpiece has a hollow interior and said hollow interior has mounted therein a connecter for a flexible conduit.

3. A wild game call as claimed in claim 2 wherein there is in addition, a means for fastening the mouthpiece to a person using the call.

4. A wild game call as claimed in claim 2 wherein there is in addition, a means for fastening the mouthpiece and a means for fastening the wild game call to a person using the wild game call.

5. A wild game call as claimed in claim 1 wherein the end opposite of the end with the mouthpiece has in addition, an adjustable bellows.

6. A wild game call as claimed in claim 1 wherein a flexible conduit, connected to the main housing by a connector is used in lieu of a mouthpiece.

7. A wild game call as claimed in claim 6 wherein there is in addition, a means for fastening the wild game call to a person using the call.

8. A wild game call as claimed in claim 1 wherein there is an air-actuated sound-producing member mounted on the top opening of the air chamber, and above the adjustable tongue.

9. A wild game call as claimed in claim 8 wherein the air-actuated sound-producing member has a turkey calling sound.

10. A wild game call as claimed in claim 8 wherein the air-actuated sound-producing member has a deer calling sound.

11. A wild game call as claimed in claim 8 wherein the air-actuated sound-producing member has an elk calling sound.

12. A wild game call as claimed in claim 8 wherein the air-actuated sound-producing member has a moose calling sound.

13. A wild game call as claimed in claim 8 wherein the air-actuated sound-producing member has a fox calling sound.

14. A wild game call as claimed in claim 8 wherein the air-actuated sound-producing member has a duck calling sound.

15. A wild game call as claimed in claim 8 wherein the air-actuated sound-producing member has a goose calling sound.

16. A wild game call as claimed in claim 8 wherein the air-actuated sound-producing member has a wolf calling sound.

17. A wild game call as claimed in claim 8 wherein the air-actuated sound-producing member has a coyote calling sound.

18. A wild game call as claimed in claim 8 that is a predator call.

19. A wild game call as claimed in claim 8 wherein the air-actuated sound-producing member has a caribou calling sound.

20. A wild game call as claimed in claim 8 wherein the air-actuated sound-producing member has a wild hog call.

21. A wild game call as claimed in claim 8 wherein the air-actuated sound-producing member has a bear call.

22. A wild game call as claimed in claim 1 wherein the component parts of the wild game call are manufactured from plastics.

23. A wild game call, said wild game call comprising in combination:
   a main housing having a top side, a bottom side, a near end, a distal end, and a middle section;
   said main housing having an opening in the top side near the middle section and said opening having a back edge and a front edge;
   a mouthpiece slidably attached to one end of said main housing;
   a call module insertable in the opening in the top side of the main housing, said call module comprising in combination a top plate, a back wall with a centered opening therethrough, a hollow reed holder having distal end, said distal end of the reed holder being insertable in the centered opening, a reed, said reed having a distal end, said reed being inserted at the distal end thereof into the centered opening beneath the hollow reed holder;
   said main housing containing a partial vertical wall located near the back side of the opening in the main housing;
   a threaded hole located in the bottom side of the main housing, said threaded hole opening into the main housing beneath the call module;
   a pitch adjuster threadedly insertable into the threaded hole, said pitch adjuster being comprised of a threaded staff mounted at the center of a knob, said threaded staff having a distal end, the length of the pitch adjuster threaded staff being such that when fully turned into the threaded hole, the distal end of the staff will touch the reed when the reed is fully compressed against the reed holder;
   a flexible tab having a distal end, the flexible tab being located beneath the hollow reed holder and insertable by the distal end into the centered opening in the back wall.

24. A wild game call as claimed in claim 23 wherein there is a gasket located between the top of the call module and the opening in the main housing.

25. A predator call, said predator call comprising in combination:
   a main housing having an opening in the top side near the middle section and said opening having a back side and a front side;
   a mouthpiece slidably attached to one end of said main housing;
   a call module insertable in the opening in the top side of the main housing, said call module comprising in combination, a top plate, a back wall with a back surface and a front surface, with a centered opening therethrough, said back wall also containing a second opening therethrough;
   a freely rotatable knob located at the back surface of the back wall, said freely rotatable knob having a centered opening and a first set of at least two spaced-apart adjacent openings therethrough;
   an elongated solid barrel located beneath the top plate and adjacent the back wall, the elongated solid barrel has a centered opening and a second set of at least two spaced-apart adjacent openings therethrough, said adjacent openings each having a different size from the other adjacent openings,
   an elongated solid barrel located beneath the top plate and adjacent the back wall, said elongated solid barrel having a centered opening and three spaced-apart adjacent openings therethrough, said adjacent openings each having a different size from the other adjacent openings,
   a shaft, said shaft insertable in the centered opening of the elongated solid barrel and through the centered opening in the back wall and terminating in the centered opening of the freely rotatable knob such that when the knob is rotated, the elongated solid barrel is also rotated;
   indicator markings on the outside surface of the elongated solid barrel adjacent each of the different sized openings to indicate the opening size.

26. A call module for use in a wild game call, said module comprising in combination a retainer flap having a back edge, surmounted on a flexible diaphragm, said flexible diaphragm having an upper surface, a lower surface, and a back edge, a tongue, said tongue having an air channel therethrough, a reed wedge, a flexible riser molded into the lower surface of the flexible diaphragm, a flexible tongue, a reed surmounting the flexible tongue, a seal between the retainer flap and the flexible diaphragm, a back wall integrally attached to the back edge of the retainer, a flexible back support integrally attached to the back edge of the flexible diaphragm, a base having a centered threaded opening therethrough, said threaded opening containing therein a pitch adjuster threadedly insertable into the threaded opening, said pitch adjuster being comprised of a threaded staff mounted on the center of a knob, said threaded staff having a distal end, the length of the pitch adjuster threaded staff being such that when turned into the threaded opening, the distal end of the threaded staff can touch the tongue and have the capability of moving the tongue.

* * * * *